United States Patent [19]

Clem

[11] 4,103,499

[45] Aug. 1, 1978

[54] METHOD OF FORMING A WATER BARRIER AROUND FOUNDATIONS

[75] Inventor: Arthur G. Clem, Des Plaines, Ill.

[73] Assignee: American Colloid Company, Skokie, Ill.

[21] Appl. No.: 800,475

[22] Filed: May 25, 1977

Related U.S. Application Data

[60] Division of Ser. No. 626,572, Oct. 28, 1975, Pat. No. 4,048,373, Continuation-in-part of Ser. No. 472,668, May 23, 1974, Pat. No. 3,949,560.

[51] Int. Cl.² .................... E02D 3/14; B23B 19/00
[52] U.S. Cl. .................................. 61/50; 61/36 C; 52/169.14
[58] Field of Search ............ 61/36 R, 35, 36 C, 50, 61/30; 428/71, 72, 537, 538, 182, 454; 52/169.14

[56] References Cited

U.S. PATENT DOCUMENTS

| 2,898,759 | 8/1959 | Pebley | 52/169.14 |
| 3,016,713 | 1/1962 | Deming | 61/1 R |
| 3,407,552 | 10/1968 | Cassidy | 52/169.14 |
| 3,772,893 | 11/1973 | Eilers | 61/36 R |

FOREIGN PATENT DOCUMENTS 1,634,620  9/1960  Fed. Rep. of Germany ........ 52/169.14

Primary Examiner—Paul R. Gilliam
Assistant Examiner—A. Grosz
Attorney, Agent, or Firm—Richard H. Anderson

[57] ABSTRACT

A panel is provided forming a water barrier and comprising two opposing spaced sheets having between said spaced sheets a sealant composition comprising bentonite; a water soluble dispersing agent selected from the group consisting of a water-soluble salt of acetic acid, a water-soluble salt of phosphoric acid, and a water-soluble salt of boric acid; and a water-soluble polymer selected from the group consisting of polyacrylic acid, water-soluble salts of polyacrylic acid, hydrolyzed polyacrylonitrile, polyvinyl acetate, polyvinyl alcohol, copolymers of the foregoing, and a copolymer of acrylic acid and maleic anhydride, the amount of water-soluble polymer in said sealant composition being from 0.1% to 3.0%, by weight, and the amount of water-soluble dispersant in said sealant composition being from 0.1% to 3.0%, by weight, the weight ratio of water-soluble dispersant to water-soluble polymer being from 6:1–36. The panel is disposed against a foundation to act as a water barrier, shielding the foundation against water seepage.

2 Claims, 3 Drawing Figures

U.S. Patent  Aug. 1, 1978  4,103,499
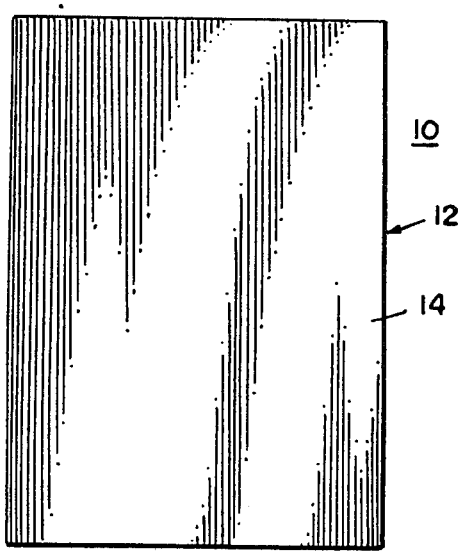
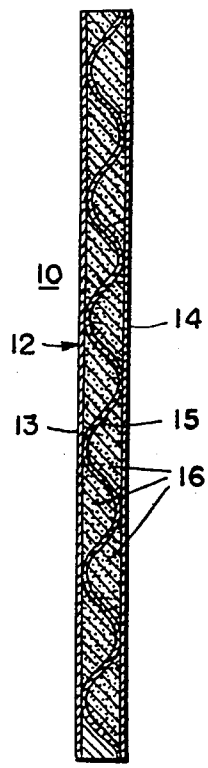
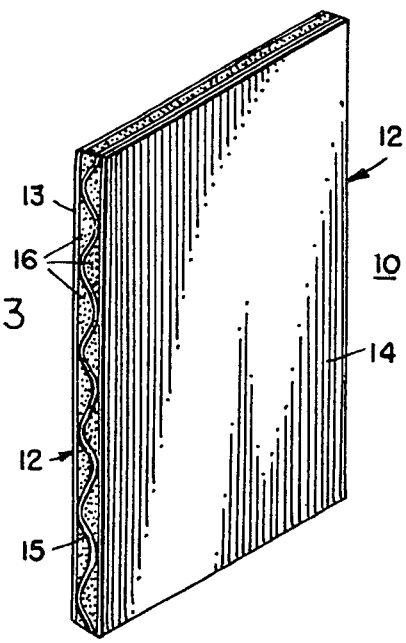

METHOD OF FORMING A WATER BARRIER AROUND FOUNDATIONS

CROSS REFERENCE TO RELATED APPLICATION

This is a divisional application of Ser. No. 626,572, Oct. 28, 1975. Now U.S. Pat. No. 4,048,373; and a C I P of Ser. No. 472,668, May 23, 1974. Now U.S. Pat. No. 3,949,560.

This invention relates to an improved moisture impervious panel and more particularly, to a preformed moisture impervious panel impervious to water containing high concentrations (more than 4%) of sodium chloride.

It is already known to provide seepage resistant structures by disposing a mass of swellable bentonite across a path of possible seepage or flow of water and confining the mass to the area of possible water seepage. One such method and means for impeding the seepage or flow of water is disclosed in U.S. Pat. No. 2,277,286, granted Mar. 24, 1942, to Paul Bechtner, and assigned to the same assignee as the present invention. As therein more fully described, commercial bentonite is used to block seepage or flow of water and structures of various types are safeguarded against leakage by blocking the path of flow of the water with bentonitic or highly colloidal clay which possesses the capacity to swell and gelatinize upon contact with water.

Some physical characteristics which distinguish bentonite from other clays are its permeable texture and its extremely small grain size. The grain particles, when wetted, adsorb films of water that are thicker than the films which form on other claylike materials, and after the bentonite has been wetted, the water cannot be expelled, even at high pressures. The strong absorptive power of commercial bentonite which will adsorb almost five times its weight of water is partially attributable to the preponderance of extremely small grains or particles, providing tremendous surface area for the exertion of adsorptive powers and the film retaining capacity of these particles. Commercial bentonite swells when contacted with water as much as ten to twenty times its dry volume. One factor which causes this swelling is the separation of the small particles by the water films adsorbed thereon. Another is the distinctive nature of the particles themselves, which are composed of minute platelike structures that possess the peculiar property of allowing water molecules to penetrate their crystal lattice. The crystal structure itself is thus expanded. A third factor is the mutual repulsion of the particles due to like negative polarity. In its swollen condition, bentonite has several advantageous properties; it will carry materials in suspension; it exerts a cohesive effect; when left quiescent it forms a permanent gel, the viscosity of which increases upon aging. An important aspect of the swelling of bentonite is that it will swell only to the extent necessary to fill available space without exerting substantial pressure when confined against further swelling. These properties make it an ideal material for incorporation in a dry or slightly moist state at points where leakage possibilities occur so that if cracks or other leakage should develop, the bentonite will come into contact with the leaking or seeping water and swell to stop the seepage but will not create pressure which might cause further damage.

In accordance with my prior U.S. Pat. No. 3,186,896 of June 1, 1965, there is provided an improved preformed moisture impervious panel comprising a corrugated paperboard carrier including a pair of spaced facing sheets interconnected by a corrugated strip which forms a plurality of voids between the strips and respective ones of the facing sheets. The voids are filled with a compacted mass of finely divided colloidal clay, such as bentonite, which is capable of swelling when contacted with water. The present invention relates to a panel containing the bentonite composition disclosed and claimed in my U.S. Pat. No. 3,949,560.

SUMMARY OF THE INVENTION

This invention is predicated on the surprising discovery that a compositin when formed into a panel, as by filling a corrugated sheet, will prevent seepage of water therethrough when the ground water supply contains large amounts of sodium chloride, for example up to 15 percent sodium chloride. The backfill for the panels comprises a porous granular material, such as sand, and the backfill is flooded to hydrate the composition inside the panel causing the composition to swell to the degree permitted by the composition of the backfill.

Accordingly, one of the principal objects of the present invention is to disclose and provide a method for forming foundations and other in-ground structures which will not allow seepage therethrough of water containing 4% or more sodium chloride.

Another object of the present invention is to disclose and provide a panel, which when filled with a bentonite composition, will prevent seepage of water through the soil, including water contaminated with 4% or more of sodium chloride.

Still another object of the present invention is to disclose and provide a panel filled with a soil sealant composition containing, as essential ingredients, bentonite, a certain type of water-soluble dispersant, and a certain type of water-soluble polymer.

Still a further object of the present invention is to disclose and provide a method of forming foundations and other below-ground structures capable of precluding the seepage of water, contaminated with up to 20 percent sodium chloride, into said below-ground structure, said method including the steps of forming a mixture of soil and a soil sealant composition composed of bentonite, a water-soluble dispersing agent, and a water-soluble polymer, forming a panel containing said composition, disposing said panels around the outside of an in-ground structure, and hydrating the bentonite composition contained in said panels by contacting same with water substantially uncontaminated with sodium chloride.

Still another and further object of the present invention is to disclose a panel filled with a bentonite composition which does not disintegrate when contacted with water containing up to 20 percent sodium chloride.

Other objects of the present invention will be apparent from the following detailed description in which all parts and percentages are by weight unless specifically indicated otherwise.

DESCRIPTION OF THE DRAWINGS

FIG. 1 is an elevational view of the panel.

FIG. 2 is a cross-sectional view of the panel taken along line 2—2 of FIG. 1.

FIG. 3 is a perspective elevational view of the panel.

DESCRIPTION OF THE PREFERRED EMBODIMENT

The invention herein relates to a panel filled with a composition containing bentonite, a water-soluble dispersant, and a water-soluble polymer. The bentonite composition is contained between spaced facing sheets to provide a panel useful in preventing leaking of salt contaminated water into a belowground structure, such as a building foundation.

Referring now to the drawing, there is illustrated a preformed moisture impervious panel, generally illustrated at 10, and formed of a corrugated paperboard carrier or form 12 including a pair of spaced paperboard facing sheets 13 and 14, joined and interconnected by a paper corrugated strip 15 to form a plurality of voids between the strips 15 and the facing sheets 13 and 14. The voids are filled with a compacted mass of finely divided swellable bentonite composition 16.

It will be appreciated that the panel 10 may be preformed and assembled into a moisture impervious structure which may be readily sawed or cut to the desired shape in the field. When subjected to leakage or seepage of moisture, the water pervious paper facing sheets 13 and 14 will pass the moisture to the bentonite composition 16. The bentonite composition first contacted absorbs water, swells and forms a gel which is permanently resistant to seepage.

The facing sheets 13 and 14 need not be impervious to water; it is sufficient that they give suitable physical strength during shipping and assembly of the panel 10 and that they have no openings which permit the escape of the compacted bentonite composition therethrough. When the confined bentonite composition is contacted with water which has seeped through the facing sheets 13 or 14, the bentonite composition at the surface of the respective facing sheets 13 or 14 immediately absorbs water, swells enormously and forms a gelatinous mass which in itself is impervious to water and provides a moisture impervious panel. Moreover, the water impervious surface of the bentonite composition will prevent swelling of the remainder of the bentonite composition so that only the amount of bentonite composition which can fill the voids will absorb moisture and swell to capacity.

Although the physical strength of the mass of bentonite composition 16 in the voids may be increased by packing the bentonite composition in place, to provide a structure capable of transportation without spilling the bentonite 16 from the ends of the void, the edges of the panel 10 may be sealed with wax, tape, or other suitable means. The panel can also be sealed with a suitable water-soluble gum.

THE BENTONITE COMPOSITION

The bentonite utilized in the present invention is one which will hydrate in the presence of water, i.e., will swell in the presence of water. A preferred bentonite is sodium bentonite which is basically a hydratable montomorillonite clay which has sodium as its predominate exchangeable ion. However, the bentonite utilized in the present invention may also contain other cations such as magnesium and iron. The particular cation contained in the bentonite is not important; what is important is the replaceable or exchangeable cation which may be either sodium or calcium. As noted above, the sodium bentonite will swell in water and is therefore the type of bentonite which is useful in the present invention.

In order to assure that the bentonite composition is capable of preventing leakage of water contaminated with sodium chloride it is absolutely necessary that the soil sealant composition include a water-soluble dispersant and a water-soluble polymer.

The water-soluble dispersant is preferably a water-soluble salt of phosphoric acid (a phosphate) such as hypophosphate, orthophosphate, metaphosphate, and pyrophosphate. The particular cation forming the salt is not important providing that the resulting salt is water-soluble. For example, the cation can be almost any meta such as an alkaline metal. Exemplary of the alkaline metal salts are sodium orthophosphate, trisodium orthophosphate, sodium metaphosphate, and sodium pyrophosphate. Other alkaline metals which are useful in producing phosphate salts which may be utilized in the present invention are potassium orthophosphate, potassium hydrophosphate, potassium pyrophosphate, and lithium phosphate.

As noted above, the water-soluble phosphoric acid salts are the preferred dispersants for the bentonite composition; however, other water-soluble dispersants can be used among which may be mentioned the borates and acetates. Any of the water-soluble boric acid salts are useable, particularly those derived from the alkali metal and alkaline metals. Exemplary of such borates are the sodium metaborate and sodium tetraborate. Also there may be mentioned lithium and potassium borates. Salts of acetic acid which are usable are the water-soluble alkali metal and alkaline earth metal salts such as sodium acetate, potassium acetate, and lithium acetate.

The amount of dispersant utilized in the soil sealant composition of the present invention may vary from 0.1% to 3% with the preferred range being from, say, 0.5% to 2 or 3%, by weight, based on the entire weight of the bentonite, water-soluble dispersant, and water-soluble polymer.

The preferred water-soluble polymer of the bentonite composition is polyacrylic acid. As is known in the art, the salts of polyacrylic acid can be polymerized directly from the salts of acrylic acid. If desired, the salt of polyacrylic acid can be acidified to give polyacrylic acid. In this invention, polyacrylic acid can be utilized per se or, preferably, the water-soluble salts or partial salts thereof.

Other water-soluble polymers which may be utilized in the bentonite composition are hydrolyzed polyacrylonitrile, polyvinyl acetate, and polyvinyl alcohol. Additionally, copolymers of the foregoing can also be utilized and, preferably copolymers of polyacrylic acid and polyacrylonitrile, polyvinyl acetate, or polyvinyl alcohol. Moreover, another preferred copolymer is the copolymer of acrylic acid and maleic anhydride.

It is preferred that the above polymers have a molecular weight of at least about 100,000 and preferably 150,000 or more. The preferred molecular weight is between 500,000 and 2,000,000 or more.

The amount of water-soluble polymer utilized in the soil sealant composition of the present invention may range from 0.1% to 3.0%, by weight with the preferred range being from about 0.5% to 2 or 3%, by weight. The weight ratio of water-soluble dispersant to water-soluble polymer is preferably from 6:1–36.

The bentonite composition is made very easily by merely dry mixing the bentonite, the water-soluble polymer, and the water-soluble dispersant to form a dry, granular or powder like composition. This dry composition can be easily introduced into the open ends of a corregated sheet, as shown in the drawing. It is understood that other structural panels can also be used as the facing sheets for confining the bentonite composition so long as the bentonite composition has access to surrounding water.

Although the present invention has been described by reference to only a single embodiment thereof, it will be apparent that numerous other modifications and embodiments may be devised by those skilled in the art and it is intended by the appended claim to cover all modifications and embodiments which fall within the true spirit and scope of the present invention.

I claim:

1. A method of forming a water barrier around an inground foundation comprising, removing soil from the location where the inground foundation is to be formed, constructing a foundation in the location from which the soil was removed, locating a panel against the foundation and backfilling on the other side of the panel, said panel containing a soil sealant composition comprising bentonite; a water-soluble dispersing agent selected from the group consisting of a water-soluble salt of acetic acid, a water-soluble salt of phosphoric acid, and a water-soluble salt of boric acid; and a water-soluble polymer selected from the group consisting of polyacrylic acid, water-soluble salts of polyacrylic acid, hydrolyzed polyacrylonitrile, polyvinyl acetate, polyvinyl alcohol, copolymers of the foregoing, and a copolymer of acrylic acid and maleic anhydride, the amount of water-soluble polymer in said soil sealant composition being from 0.1% to 3.0%, by weight, and the amount of water-soluble dispersing agent in said soil sealant composition being from 0.1% to 3.0%, by weight, and filling said void space.

2. A method as defined in claim 1 wherein the other side of the panel is backfilled with a granular aggregate and further including flooding said granular aggregate with water substantially uncontaminated with sodium chloride to hydrate the sealant composition whereby said panel will prevent seepage of water contaminated with sodium chloride through said panel.

* * * * *